Sept. 26, 1939.  W. P. FITZ-RANDOLPH  2,173,833
ABRASIVE ARTICLE AND ITS MANUFACTURE
Filed Oct. 7, 1937
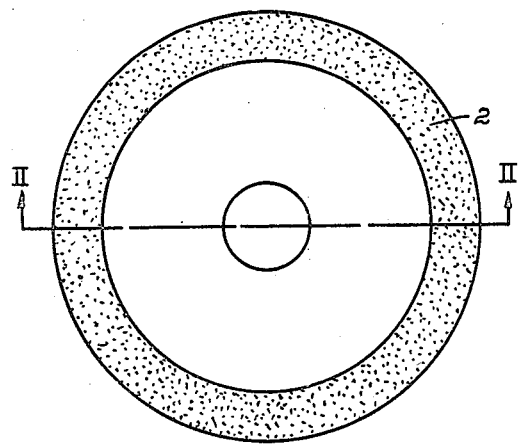
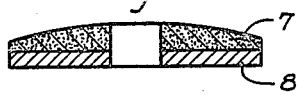
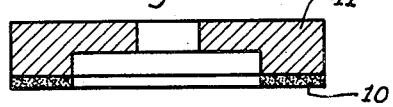
INVENTOR.
WILLIAM P. FITZ-RANDOLPH
BY
ATTORNEY.

Patented Sept. 26, 1939

2,173,833

UNITED STATES PATENT OFFICE

2,173,833

ABRASIVE ARTICLE AND ITS MANUFACTURE

William P. Fitz-Randolph, Niagara Falls, N. Y., assignor to The Carborundum Company, Niagara Falls, N. Y., a corporation of Delaware Application October 7, 1937, Serial No. 167,807

4 Claims. (Cl. 51—280)

This invention relates to metal bonded abrasives and their manufacture, and particularly to the metal bonding of diamonds.

One of the objects of the invention is to produce an improved metal bonded abrasive article, and particularly one which is adapted to cut glass and other hard materials. Another object is to provide a metal bond which will produce a wheel having a satisfactory life, and which at the same time will sinter at a very low temperature. A further object is to produce a wheel having a higher cutting rate than is obtained with the hard bonds ordinarily used for metal bonded wheels. These and other objects will be apparent from the following description.

In using metal as a bond for abrasives, the principal object is to produce a wheel which will have a longer life and which will preserve its contour for longer periods of time than an abrasive wheel made from the usual non-metallic bonds. These properties are of particular advantage in a wheel containing expensive abrasives such as diamonds, since any appreciable wheel loss involves expense in the loss of the diamond abrasive. The wear resistance of the wheel has ordinarily been considered as being dependent upon the hardness or wear resistance of the metal or alloy used as the bond, and for this reason, extremely hard metals and alloys have ordinarily been used as bonding agents. The metal bonded diamond wheels available commercially are bonded with such hard materials as iron, sintered tungsten carbide or alloys containing molybdenum or other hard ingredients.

One of the principal disadvantages of a metal bonded wheel having a hard bond consists in the slow cutting rate with which the wheel cuts most hard materials. As a result of this slow cutting rate, the diamond content of the wheels has frequently been increased to a point where they become very expensive. The usual commercial iron bonded diamond wheel may have a diamond content of from 20 to 30% by weight, which is practically half the entire volume of the cutting portion of the wheel. Even with this high content, the wheel has a cutting rate which is very small in comparison with that which can be obtained with non-metallic bonds.

I have found that tin, especially when hardened by alloying agents as will be further described, forms a satisfactory bond for diamonds in the cutting of glass and other hard materials. As practically all tin alloys are relatively soft and low melting, one would expect that such bonds would be inoperative when the material to be cut is extremely hard. I have found, however, that tin or tin alloy bonded diamonds will cut hard materials such as glass at a rate which is even higher than that obtained with the usual hard bonds such as iron. Even though the matrix may be fairly soft and resilient, the wear is taken up by the abrasive particles distributed over the surface, and the bond, instead of rapidly wearing away, preserves its contour and has a fairly long life.

In utilizing tin as a bond, it is desirable to harden the tin with such hardening agents as copper, antimony, zinc and other similar materials, and particularly those which form intermetallic compounds or phases which are structurally different from tin itself. In the use of such alloy, I have found it possible to secure a matrix which is considerably harder than pure tin and which at the same time has a sintering temperature as low as approximately 200° C. In addition to the binary alloys, many ternary and quaternary alloys, and especially alloys containing tin, antimony and copper, are satisfactory as abrasive bonds and particularly as bonds for diamonds. Although these materials are moderately deformable, the intermetallic compounds present are very hard and resist the abrasion which might otherwise wear away the alloy matrix. This wear resistance can also be increased by the addition of an abrasive less hard than the diamond, such as for example silicon carbide or fused alumina.

The high cutting rate characteristic of tin alloy bonds can be produced with a much lower diamond concentration than is ordinarily used in a commercial metal bonded diamond wheel. I have found for example that with an alloy bond containing 90% tin and 10% copper, and with a diamond content of only about 4%, a cutting rate can be obtained which is several times that of a commercial iron bonded wheel containing from 4 to 5 times this percentage of diamonds. The higher cutting rate and the much lower diamond content will permit a somewhat higher wheel loss than would be commercially practicable with an iron bonded wheel.

Wheels in which diamonds are bonded with tin alloys can be used for the grinding of lenses or other forms of glass, and for the cutting or lapping of ceramic materials, quartz, sintered tungsten carbide, silicon carbide and other hard carbides.

In making the wheels, it is desirable to have sufficient abrasive scattered throughout the metal matrix so as to present a wear resistant surface. I have found that an abrasive content of approximately 10 to 15% is desirable, and when low diamond concentrations are used, the remainder of the abrasive can consist of such materials as silicon carbide or fused alumina. This additional abrasive increases the wear resistance of the tin alloy matrix, and presents a uniform surface of hard particles which is not readily worn down by the material being ground. Desirable abrasive concentrations range from about 2 to 10 per cent diamonds and from 5 to 25 per cent of an abrasive less hard than the diamonds, as for example, silicon carbide, boron carbide, fused alumina, garnet or quartz. Even a hard glass has a beneficial effect when added to increase the wear resistance of the wheel. Higher diamond concentrations can of course be used, with or without the additional abrasive.

While a fairly high cutting rate can be produced with a bond which consists almost entirely of tin, the addition of certain alloying agents is desirable to give improved wear resistance or life to the wheel. This effect can be produced even with minor proportions of alloying ingredients. I have found that the most satisfactory alloying agents for the hardening of the tin bond are copper, zinc, magnesium, and antimony. A combination of copper and antimony is also effective. In alloys containing copper or antimony or both, intermetallic compounds are formed between the copper and antimony or the antimony and the tin. With the addition of magnesium and copper, phases are formed which are harder and different in structure from pure tin. The proportion of alloying ingredients may vary from about 2 to 30 per cent, depending upon the hardness desired, and the particular application for which the wheel is to be used.

The accompanying drawing shows as illustrative examples a few of the abrasive wheels for which tin base alloy bonds have been found satisfactory.

In the drawing:

Figure 1 shows an abrasive ring or disk of the type adapted for grinding tungsten carbide tools;

Figure 2 is a section of the wheel shown in Figure 1, the section being taken along the line II—II;

Figure 3 is a section of a glass grinding disk or lap of a type which can be used for grinding lenses;

Figure 4 illustrates a metal cup wheel which can be used for the surfacing of refractories or ceramic materials.

The wheel shown in Figures 1 and 2 consists of an abrasive layer 2 containing diamonds or other hard abrasives such as boron carbide and a metal backing layer 3. The two layers can be sintered simultaneously from metal powders into a coherent mass. This mass forms an abrasive ring 4 which can be mounted on a backing 5. The backing 5 can be made of metal, synthetic resin or other suitable material. In making the backing layer 3 for the abrasive ring, it is desirable to add a cheap abrasive in approximately the proportions of the abrasive included in the surface layer 2. If the ring 4 is not to contain an expensive abrasive such as diamonds or boron carbide, it can of course be made from the same composition throughout and the composite ring is unnecessary.

The wheel shown in Figure 3 is of the type which can be used in the grinding of lenses. This wheel consists of an abrasive layer 7 composed of metal bonded diamonds and a metal backing 8 which, if sintered simultaneously with the abrasive layer, should also contain an abrasive so as to maintain the same shrinkage as that of the diamond layer. If desired, the wheel can be made with a facing containing boron carbide and a metal mixture containing silicon carbide or fused alumina as the backing, or the wheel can be made entirely from metal bonded silicon carbide or fused alumina. Figure 4 shows a section of a cup wheel which has been found suitable for the surfacing of refractories such as silicon carbide or fireclay bricks and shapes. The abrasive layer 10 may consist of diamonds bonded with a tin alloy, or a mixture of diamonds, silicon carbide or other cheaper abrasive and a tin alloy bond. The backing 11 can be of resin, metal or any other suitable material.

In making a metal bonded diamond wheel in which an abrasive other than diamonds is added to the mix, the additional abrasive stiffens the metal and makes it very resistant to wear or abrasion. Thus even in cases when the additional abrasive does practically no cutting, it greatly reduces the wheel loss which under ordinary conditions is due at least in part to the wearing away of the metal matrix surrounding the diamonds. The addition of materials such as silicon carbide or fused alumina to the mix makes possible the use of a low percentage of diamonds even with a comparatively soft matrix. The action of the additional abrasive in making the matrix resistant to wear is of special importance in the cutting of glass, silicon carbide or other hard materials which readily chip or form detritus and which in themselves have an abrasive action upon the metal used as the bond.

In making abrasive articles of the type described, a mix can be consolidated either by hot pressing, cold pressing or a combination of both methods. In making the abrasive articles by cold pressing, the abrasive is mixed with powdered comminuted tin or comminuted tin alloy or with the powdered component metals in the proper proportions to produce the alloy desired. The mix can then be pressed under a pressure of for example about 10,000 pounds per square inch. The molded articles are then sintered in a non-oxidizing atmosphere at a temperature sufficient to produce the coalescence of the metal particles so as to form a strong metallic bond. The temperature required for sintering will depend of course upon the specific alloy used, but I have found that for most tin base alloys a temperature of about 200° C. is satisfactory. It will be observed that this sintering temperature is far below that used for the sintering of the harder bonds such as iron or sintered tungsten carbide, and for this reason the original abrasive properties of the diamonds can be maintained without abrasive properties of the diamonds being impaired by the action of heat.

When the articles are cold pressed and subsequently sintered, it may be desirable to apply at least a slight pressure during the heating process so as to prevent warping and to maintain accurate shape. For this purpose the wheel or other object can be confined in a mold having the shape of the finished article and a slight pressure applied during sintering. Flat wheels or rings can be sintered by placing them between ceramic bats and applying a slight pressure. The application of pressure during sintering, while of advantage, is not absolutely necessary, since I have been able to produce satisfactory articles by cold pressing and sintering without the application of pressure during the heating process.

When the article is to be made by hot pressing, the comminuted metal or alloy is first mixed with the abrasive grain, or if component metals are used to form the alloy, these metals are thoroughly mixed and are then mixed with the abrasive. The abrasive mix is introduced into a carbon mold and the mix is heated with the simultaneous application of pressure until the final sintering temperature is reached. A very dense article can be produced by this method, since tin alloys become plastic even upon heating slightly above room temperature.

Suitable compositions for wheels of the type shown in Figures 1 to 4 are illustrated by the following examples:

Example I

|  | Percent |
|---|---|
| Diamonds | 3 |
| Silicon carbide | 7 |
| Tin | 72 |
| Copper | 18 |

Example II

|  | Percent |
|---|---|
| Diamonds | 4 |
| Fused alumina | 16 |
| Tin | 72 |
| Copper | 8 |

Example III

|  | Percent |
|---|---|
| Diamonds | 5 |
| Silicon carbide | 10 |
| Tin | 70 |
| Antimony | 10 |
| Copper | 5 |

Example IV

|  | Percent |
|---|---|
| Diamonds | 3 |
| Silicon carbide | 7 |
| Tin | 82 |
| Antimony | 8 |

The above examples are merely illustrative and are not intended to be limiting. Satisfactory cutting rates and wheel life have been obtained by varying these alloying ingredients over a fairly wide range. Zinc, magnesium and other similar metals can be added to bonds containing antimony or copper or both. Iron or other high melting metals can be added, as described in my co-pending application Serial No. 167,808 filed of even date herewith.

The bonds described can also be used for bonding boron carbide, silicon carbide, fused alumina or mixtures of these abrasives. Boron carbide can be bonded with a tin base alloy and an abrasive having a lesser degree of hardness can be included in the mix to increase the wear resistance of the wheel. Other types of wheels and tools can also be produced by bonding diamonds or other abrasive with tin base alloys, such as for example laps for edging of lenses, toric lens grinding tools and other similar articles.

The invention can be defined as being within the scope of the following claims.

I claim:

1. An abrasive article comprising diamonds and a sintered metal bond consisting principally of tin, said bond containing a metallic alloying agent which hardens the tin.

2. An abrasive article comprising diamonds and a sintered metal bond comprising an alloy of tin and copper containing at least 70% tin.

3. A metal bonded abrasive article comprising diamonds and a sintered tin-zinc alloy bond consisting principally of tin.

4. A metal bonded abrasive article comprising diamonds and a sintered tin-antimony alloy bond consisting principally of tin.

WILLIAM P. FITZ-RANDOLPH.